United States Patent
Rossi et al.

(10) Patent No.: US 12,516,617 B2
(45) Date of Patent: Jan. 6, 2026

(54) MOTOR VEHICLE PROVIDED WITH AN AFTER-TREATMENT APPARATUS AND A DEVICE FOR HEATING THE AFTER-TREATMENT APPARATUS

(71) Applicant: FERRARI S.P.A., Modena (IT)

(72) Inventors: Vincenzo Rossi, Modena (IT); Roberto Tonelli, Modena (IT); Luca Brocchi, Modena (IT); Fabio Malinverno, Modena (IT)

(73) Assignee: FERRARI S.P.A. (IT)

(*) Notice: Subject to any disclaimer, the term of this patent is extended or adjusted under 35 U.S.C. 154(b) by 0 days.

(21) Appl. No.: 18/895,024

(22) Filed: Sep. 24, 2024

(65) Prior Publication Data

US 2025/0116217 A1  Apr. 10, 2025

(30) Foreign Application Priority Data

Oct. 4, 2023  (IT) .................. 102023000020529

(51) Int. Cl.
| | |
|---|---|
| *F01N 3/025* | (2006.01) |
| *F01N 3/023* | (2006.01) |
| *F01N 3/20* | (2006.01) |

(52) U.S. Cl.
CPC ............ *F01N 3/0253* (2013.01); *F01N 3/023* (2013.01); *F01N 3/025* (2013.01); *F01N 3/0256* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 5,617,720 A * | 4/1997 | Achleitner | F01N 3/2033 60/284 |
| 2005/0150221 A1* | 7/2005 | Crawley | F23N 5/022 60/297 |

(Continued)

FOREIGN PATENT DOCUMENTS

| | | |
|---|---|---|
| DE | 102021001585 A1 | 9/2022 |
| EP | 0599050 B1 | 6/1994 |

(Continued)

OTHER PUBLICATIONS

Search Report issued in Italian Patent Application No. 102023000020529.

*Primary Examiner* — Binh Q Tran
(74) *Attorney, Agent, or Firm* — The Belles Group, P.C.

(57) ABSTRACT

A motor vehicle includes an internal combustion engine, an after-treatment device to treat first exhaust gases produced by the internal combustion engine, a first exhaust line configured to feed the first exhaust gases to the after-treatment device, combustion means configured to produce second exhaust gases with a combustion chamber and an injector device that can be controlled to inject the fuel into the combustion chamber, a second exhaust line configured to feed the second exhaust gases to the after-treatment device, a tank to hold the fuel, and a supply line configured to feed a fuel stream from the tank to the injector device, the supply line comprising a valve that can be controlled according to at least one first control mode and a second control mode, wherein the valve respectively allows and prevents a fuel flow passage to the injector device.

16 Claims, 2 Drawing Sheets

(52) U.S. Cl.
CPC ........ *F01N 3/2033* (2013.01); *F01N 2240/14* (2013.01); *F01N 2250/04* (2013.01); *F01N 2610/03* (2013.01); *F01N 2610/08* (2013.01); *F01N 2610/146* (2013.01); *F01N 2900/1808* (2013.01); *F01N 2900/1812* (2013.01); *F01N 2900/1821* (2013.01); *F01N 2900/1824* (2013.01)

(56) References Cited

U.S. PATENT DOCUMENTS

| | | | |
|---|---|---|---|
| 2007/0157606 A1* | 7/2007 | Schenck Zu Schweinsberg | F01N 3/36 60/303 |
| 2008/0078172 A1 | 4/2008 | Miller et al. | |
| 2009/0272103 A1* | 11/2009 | Danby | F01N 9/002 60/286 |
| 2013/0022505 A1* | 1/2013 | Tsujimoto | F01N 3/2033 422/109 |
| 2013/0239548 A1* | 9/2013 | Butzke | F01N 3/025 60/311 |
| 2015/0292376 A1* | 10/2015 | Tsumagari | F23L 15/04 422/187 |

FOREIGN PATENT DOCUMENTS

| | | |
|---|---|---|
| EP | 0813648 B1 | 9/1998 |
| IT | 20210014207 A1 | 12/2022 |

* cited by examiner

MOTOR VEHICLE PROVIDED WITH AN AFTER-TREATMENT APPARATUS AND A DEVICE FOR HEATING THE AFTER-TREATMENT APPARATUS

CROSS-REFERENCE TO RELATED APPLICATION

This patent application claims priority from Italian patent application no. 102023000020529 filed on Oct. 4, 2023, the entire disclosure of which is incorporated herein by reference.

TECHNICAL FIELD

The invention concerns a motor vehicle, in particular provided with an internal combustion engine and an after-treatment device for exhaust gases coming from the engine.

BACKGROUND

Normally, a motor vehicle including an internal combustion engine also comprises an after-treatment device for exhaust gases produced by the engine. In addition, as known, the after-treatment device operates optimally after having reached an operating temperature above a given threshold. Usually, the after-treatment device is heated, after turning on the motor vehicle, by the same exhaust gases whose heat is, however, initially mainly dispersed in the first seconds after switching-on to heat the pipes that connect the engine to the after-treatment device. However, the after-treatment device is gradually heated until reaching an optimal operating temperature.

In some cases, the after-treatment device is pre-heated to reach the optimal operating temperature in advance. For example, the use of one or more special burners is known for this purpose. The burner normally has a combustion chamber, an injector to inject a fuel in the combustion chamber, an inlet opening for the introduction of compressed air to the combustion chamber to form a mixture with the fuel injected using the injector, an ignition device for triggering the combustion of the mixture, and an outlet opening for discharging the products of the combustion, i.e. additional exhaust gases separate from those produced by the engine. The outlet opening communicates with the after-treatment device via an exhaust pipe to feed the exhaust gases produced by the burner to the after-treatment device in addition to or to replace the exhaust gases produced by the engine, thus enabling the after-treatment device to be heated in advance. In these cases, the applicant has encountered a safety issue linked to possible damage to the injector. In fact, the injector is normally controlled to prevent access to the fuel in the combustion chamber of the burner when the engine is in a normal operating condition, i.e. when the after-treatment device has already reached the optimal operating temperatures.

In any case, in the event of damage to the injector, the fuel in the pipes intended to supply the injector itself can leak through the injector, pour into the combustion chamber of the burner, pass through the outlet opening, and, finally, reach the after-treatment device, without having been burned within the combustion chamber of the burner. This constitutes a serious danger, in particular not only since the fuel would make the components of the after-treatment device very dirty, but also due to the risk of self-combustion outside the special chamber, with the connected fire risk.

Therefore, there is, in general, a need to resolve or at least address the issue described above.

One purpose of this invention is to satisfy the need described, preferably in a simple and reliable way.

DESCRIPTION OF THE INVENTION

In one aspect, the invention can be a motor vehicle comprising an internal combustion engine, an after-treatment device to treat first exhaust gases produced by the internal combustion engine, a first exhaust line configured to feed the first exhaust gases to the after-treatment device, combustion means distinct from the internal combustion engine and configured to produce second exhaust gases by combustion of a mixture comprising an oxidizer and a fuel, the combustion means comprising a combustion chamber and an injector device controllable to inject the fuel into the combustion chamber, a second exhaust line configured to feed the second exhaust gases to the after-treatment device, a tank to hold the fuel, and a supply line configured to feed a fuel stream from the tank to the injector device, wherein the supply line comprises a valve controllable according to at least a first control mode and a second control mode, and wherein the valve respectively allows and prevents a fuel flow passage to the injector device.

In one aspect, the invention can be a motor vehicle comprising an internal combustion engine, an after-treatment device configured to treat first exhaust gases produced by the internal combustion engine, a first exhaust line configured to feed the first exhaust gases to the after-treatment device, a burner distinct from the internal combustion engine, wherein the burner is configured to produce second exhaust gases by the combustion of a mixture comprising an oxidizer and a fuel, and wherein the burner comprises a combustion chamber and an injector device controllable to inject the fuel into the combustion chamber, a second exhaust line configured to feed the second exhaust gases to the after-treatment device, a tank to hold the fuel, and a supply line configured to feed a fuel stream from the tank to the injector device, wherein the supply line comprises a valve controllable according to a first control mode and a second control mode, wherein the valve allows fuel to the injector device in the first control mode, and wherein the valve prevents fuel from flowing to the injector device in the second control mode.

BRIEF DESCRIPTION OF THE DRAWINGS

Below, one embodiment of the invention will be described to better understand the same by way of non-limiting example and with reference to the attached drawings, wherein.

DETAILED DESCRIPTION OF THE INVENTION

Figure 1:
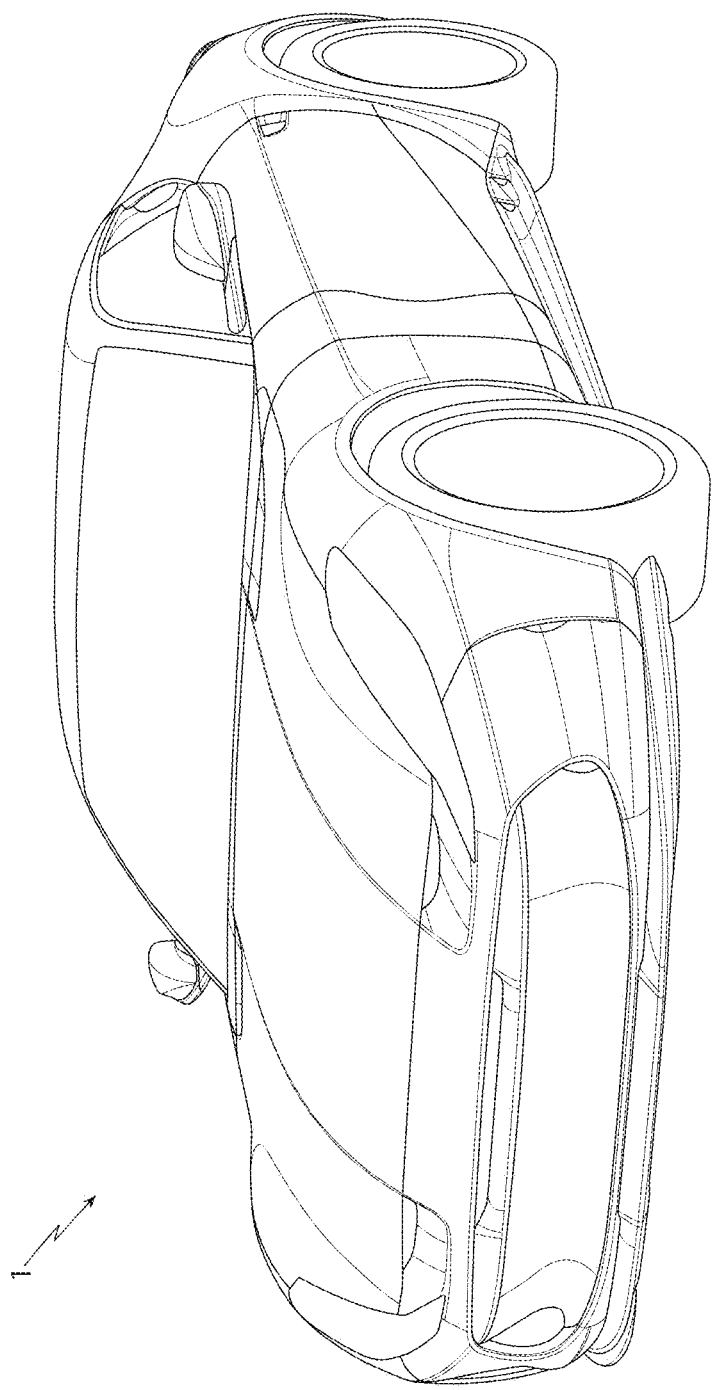
FIG. 1 is a perspective view of a motor vehicle according to the invention.

In FIG. 1, the reference number 1 is used to indicate, as a whole, a vehicle, specifically a motor vehicle, in particular a sports or race car.

The motor vehicle 1 comprises an internal combustion engine 2, for example a known one.

The engine 2 comprises one or more cylinders defining respective combustion chambers 3.

The engine 2 preferably comprises, even for each of the combustion chambers 3, a corresponding injector device 4 that can be controlled to inject a fuel, for example petrol or diesel, inside the corresponding combustion chamber 3.

The injector device 4, as known, is also configured to prevent fuel from entering the combustion chamber 3, in particular during those phases of operation of the engine 2 in which the presence of unburnt fuel is undesirable, for example, the discharge phase of the exhaust gases, following their expansion in the combustion chamber 3.

In other words, the injector device 4 can be controlled to inject fuel only when suitable or necessary, as well as, in contrast, to block the entry of fuel into the combustion chamber 3 in other cases.

This is true, of course, as long as the injector device 4 does not malfunction, which could lead to undesired leakage of fuel inside the combustion chamber 3.

The motor vehicle 1 also comprises an after-treatment device 5, for example a known one, suitable for or configured to treat the exhaust gases produced by the engine 2.

The after-treatment device 5 may comprise particulate filters, catalytic converters, and similar devices to remove harmful components from the exhaust gases.

The after-treatment device 5 receives the exhaust gases of the engine 2 as input and provides treated or purified exhaust gases, i.e. those comprising fewer harmful components compared to incoming exhaust gases, as output.

The motor vehicle 1 comprises an exhaust line 6 configured to feed the exhaust gases of the engine 2 to the after-treatment device 5.

In other words, the after-treatment device 5 receives the exhaust gases of the engine 2 as input via the exhaust line 6.

The exhaust line 6 comprises one or more exhaust pipes 7 that place an exhaust manifold of the engine 2 in communication with the after-treatment device 5, or connect them.

The exhaust line 6 may comprise other components, for example a temperature sensor 8 at one of the exhaust pipes 7 upstream of the after-treatment device 5.

In addition to the engine 2, the motor vehicle comprises a combustion assembly or burner 10 configured to produce additional exhaust gases using the combustion of a mixture comprising a fuel, in particular air, and a fuel, for example the same fuel for the engine 2.

The burner 10 comprises at least one combustion chamber 11 and an injector device 12 to inject the fuel into the combustion chamber.

For example, the injector device 12 is similar at least by function to the injector device 4, for which it serves to inject fuel only when suitable or necessary, thus preventing the entry of fuel into the combustion chamber 11 in the other cases, as long, of course, as there are no malfunctions entailing fuel losses or leakage.

The combustion chamber 11 has an inlet 13 for the oxidizer, in this case air.

The burner 10 includes a supply circuit for the oxidizer 14 for providing the oxidizer to the combustion chamber 11 via the inlet 13.

The circuit 14 preferably comprises the following components, more preferably in sequential order from the outside of the motor vehicle 1 to the combustion chamber 11, each of which may not be included and is, thus, optional:

an oxidizer filtration device or air filter 15,
a transducer 16 configured to detect a quantity indicating an oxidizer flow rate through a point of the circuit 14 and generate a related signal,
a compressor 17, for example a centrifugal one, to compress the oxidizer,
a transducer 18 configured to detect a quantity indicating an oxidizer pressure through a point of the circuit 14 and generate a related signal, and
a check valve 19 to prevent the return of the oxidizer from the combustion chamber 11, i.e. in particular towards the compressor 17.

Figure 2:
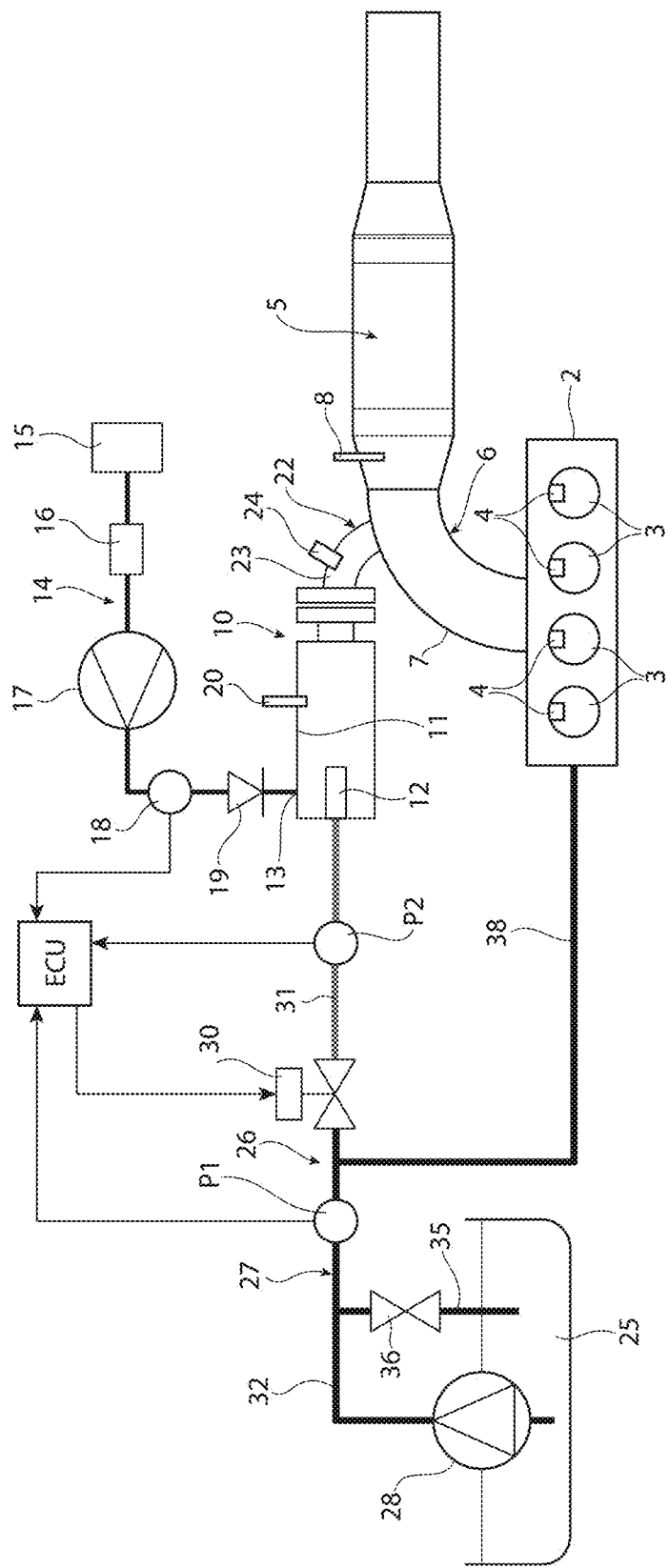
FIG. 2 is a system diagram of a portion of the motor vehicle in FIG. 1.

The transducers 16, 18 are schematically depicted in FIG. 2 as arranged at the points of the circuit 14 in which they detect the respective associated quantities, but could also actually be positioned otherwise than what is illustrated.

The dimensions of the sections of the circuit 14 among the various components listed are to be understood merely as examples without any limitation. Rather, FIG. 2 merely shows an example of the sequential order of the components listed.

The order of the listed components of the circuit 14 could be different to what is illustrated in FIG. 2; for example, the transducer 16 could be anywhere with respect to the compressor 17, instead of upstream of it.

The burner 10 also comprises, in detail, an ignition device 20 for the fuel-oxidizer mixture configured to trigger combustion of the mixture inside the combustion chamber 11. The ignition device 20 is arranged at the combustion chamber 11.

The ignition device 20 comprises, in particular, a glow plug, which is, for example, typical in diesel engines. Alternatively, or in addition, the ignition device 20 could comprise a spark plug, such as, for example, those used in petrol engines.

The combustion mechanism of the burner 10 is preferably of the continuous-flow type. In other words, the burner 10 is a continuous-flow burner. In practice, a continuous flow of the oxidizer is provided to the combustion chamber 11, while the injections of the fuel occur separately via the injector device 12.

The ignition device 20 may operate intermittently, i.e. it may operate so that the ignition of the mixture occurs with a specific frequency, in particular corresponding to the frequency of fuel injection into the combustion chamber 11 using the injector device 12.

On the other hand, although independently, the engine 2 could be of the spark-ignition kind, or for example of the compression-ignition kind.

In addition, the motor vehicle 1 comprises an additional exhaust line 22 configured to feed the exhaust gases produced by the burner 10 to the after-treatment device 5.

In other words, the after-treatment device 5 receives the exhaust gases of the burner 10 as input via the exhaust line 22 and treats or purifies them, similarly to what it does with the exhaust gases of the engine 2, i.e. fulfilling the same function already described above, this time with exhaust gases of the burner 10.

In particular, the exhaust line 22 is connected to the exhaust line 6, such that the exhaust gases of the burner 10 reach the after-treatment device 5 passing through the exhaust line 6.

In practice, the burner 10 has one or more exhausts for discharging the products of the combustion in the combustion chamber 11, i.e. exhaust gases of the burner 10.

The exhausts create a communication between the combustion chamber 11 and the exhaust line 22.

Thus, the exhaust line 22 connects or places the exhausts of the burner 10 in communication with the exhaust line 6.

This is not, however, necessary; the exhaust line 22 could also have connected or placed in communication the exhausts of the burner 10 with the after-treatment device 5 directly, instead of indirectly via the exhaust line 6 as in FIG. 2.

The exhaust line 22 comprises one or more exhaust pipes 23 that place the exhausts of the burner 10 in communication, or connect them, with one or more of the exhaust pipes 7 and, thus, indirectly with the after-treatment device 5.

The exhaust line 22 may comprise other components, for example a Lambda sensor 24 at one of the exhaust pipes 23 upstream of the exhaust line 6 or, more generally, of the after-treatment device 5.

The motor vehicle 1 comprises at least one tank 25 for holding the fuel. At least when the motor vehicle 1 is being used, the tank 25 actually holds the fuel.

In addition, the motor vehicle 1 comprises a supply line 26 configured to feed a fuel stream from the tank 25 to the injector device 12.

More specifically, the supply line 26 comprises at least one supply pipe 27, which places the tank 25 in communication with the injector device 12. In other words, the supply pipe 27 extends from the tank 25, reaching the injector device 12.

The supply pipe 27 is preferably defined by a tube with a diameter ranging between 4 mm and 8 mm, i.e., in detail, 6 mm.

In addition, the supply line 26 comprises a pump component or pump 28 configured to retrieve the fuel from the tank 25 and pump the retrieved fuel towards the injector device 12, more precisely with enough pressure so that the fuel reaches the injector device 12 and is, as a result, injected into the combustion chamber 11 with a suitable pressure for combustion.

The pump 28 is arranged at least partially inside the tank 25. The pump 28 may comprise a portion of the supply pipe 27, in particular that directly communicating with the tank 25.

According to the invention, the supply line 26 also comprises a valve 30 that can be controlled according to at least one first control mode and a second control mode, wherein the valve 30 respectively allows and prevents a fuel flow passage to the injector device 12.

In the second control mode, the valve 30 blocks the flow of fuel produced by the pump 28, thus preventing the flow to reach the injector device 12.

On the other hand, in the first control mode, the line 26 may actually fulfil the function of supplying the injector device 12 with the fuel.

More specifically, the valve 30 is a solenoid valve, i.e. an electrically driven valve, although this is not generally necessary.

In particular, the valve 30 is a shut-off valve, i.e. an on-off valve. Therefore, the valve 30 is open in the first control mode, while it is closed in the second control mode.

In detail, the valve 30 comprises an actuator, for example a known one that is not illustrated, configured to determine the control mode of the valve 30, i.e. the first or second control mode.

The valve 30 is normally closed; in other words, the valve 30 is in the second control mode when the actuator is inactive. Thus, the actuator can be driven to drive the valve 30 in the first control mode.

In this case, in which the valve 30 is optionally, electrically driven, the actuator is electric. Therefore, the valve 30 is in the second control mode when the actuator is free of electric excitation and is not excited electrically. On the other hand, the actuator is configured to drive the valve 30 in the first control mode when excited electrically.

In particular, the valve 30 is a direct acting valve.

In other words, the valve 30 comprises a shutter element, for example a known one not illustrated, which can be moved between a configuration in which it blocks the passage of the fuel flow, corresponding to the second control mode, and a configuration in which it frees the passage of the fuel flow, corresponding to the first control mode. The actuator is configured to directly drive the shutter, i.e. to move the shutter directly, in particular from the configuration in which it blocks the passage to the configuration in which it frees the passage.

The valve 30 in the first control mode is preferably configured to allow a fuel flow rate between 0.0005 and 0.003 kg/s.

The valve 30 is adapted to be installed in the supply pipe 27, in particular with reference to the diameter of the tube defining the supply pipe 27, i.e. in particular a diameter between 4 mm and 8 mm, i.e. more specifically 6 mm.

The valve 30 divides the supply pipe 27 into at least one branch 31 downstream of the valve 30 and a branch 32 upstream of the valve 30.

The branch 31 places a port of the valve 30, in particular an outlet of the valve 30, in communication with the injector device 12.

The branch 32 communicates with another port of the valve 30, in particular an inlet of the valve 30. In detail, the branch 32 places the other port of the valve 30 in communication with the tank 25.

In the second control mode, the valve 30 isolates the branch 31 from the other branch 32. In other words, the valve 30 isolates the injector device 12 from the tank 25.

The valve 30 is preferably adapted to operate in a temperature range between −40° C. and 130° C.

Conveniently, the supply line 26 comprises a safety branch 35 extending between two ends defined by respective points of the branch 32 and of the tank 25. Here, the supply line 26 comprises a safety valve 36 normally closed and configured to passively open when the fuel pressure on the branch 32 or on the safety branch 35 (upstream of the safety valve 36) exceeds a safety threshold, in particular below 8 bar, more specifically between 5 bar and 8 bar.

Thus, in the event of excess pressure of the fuel in the branch 32 or in the safety branch 35 (upstream of the safety valve 36), the safety valve 36 opens, allowing pressurised fuel to return to the tank 25. Vice versa, the safety valve 36 blocks the return of the fuel to the tank 25 through the safety branch 35 when the pressure is below the safety threshold.

The supply line 26 preferably comprises a supply branch 38 configured to feed at least a portion of the fuel stream from one point on the supply line 26 upstream of the valve 30 to the engine 2. More precisely, the supply branch 38 extends between two ends respectively at the point upstream of the valve 30 and of the engine 2.

Therefore, the supply line 26 is configured to supply both the engine 2 and the burner 10, i.e. to supply both injector devices 4, 12 with the fuel, in particular processed by the pump 28 and retrieved by that pump 28, more specifically by the tank 25.

Conveniently, the motor vehicle 1 also comprises a transducer P2 configured to detect a quantity indicating a fuel pressure downstream of the valve 30 and to generate a related signal.

The transducer P2 detects, in other words, the pressure downstream of the valve 30, i.e. on the branch 31 between the valve 30 and the injector device 12.

In addition, the motor vehicle 1 comprises a control unit ECU, in particular coupled to the transducer P2.

The control unit ECU is configured to acquire the signal provided or generated by the transducer P2 and to extract a piece of information from the signal relating to the pressure downstream of the valve 30.

Alternatively, or in addition, to everything already described above with reference to controlling the valve 30, the control unit ECU is configured to control the valve 30 based on the information extracted.

A decrease in pressure downstream of the valve 30 when the burner 10 is switched off, i.e. on the branch 31 when the injector device 12 is controlled to prevent the fuel entering the combustion chamber 11, indicates a loss of fuel on the branch 31, for example due to unwanted leakage through the injector device 12 or even of a loss from the tube defining the branch 31.

In this case, the valve 30 is controlled by the control unit ECU according to the second control mode, i.e. in particular by deactivating or keeping the actuator of the valve 30 inactive.

More precisely, the motor vehicle 1 also comprises a transducer P1 configured to detect a quantity indicating a fuel pressure upstream of the valve 30 and to generate a related signal.

The transducer P1 detects, in other words, the pressure upstream of the valve 30, i.e. on the branch 32 between the valve 30 and the tank 25 or, in detail, the pump 28.

The control unit ECU is configured to acquire the signal provided or generated by the transducer P1 and to extract a piece of information from the signal relating to the pressure upstream of the valve 30.

In other words, the control unit ECU is configured to determine a piece of information relating to a separation or shifting between the pressures downstream and upstream of the valve 30, the separation or shifting being able to be expressed, for example, using a ratio or difference or the like.

Thus, in particular, the control unit ECU is configured to control the valve 30 based on the information relating to the shifting, which clearly relates to the pressure downstream of the valve 30.

In fact, the shifting is, in any case, indicative of how the pressure downstream of the valve 30 is behaving in relation to the pressure upstream of the valve 30, the latter pressure defining a non-zero reference.

Therefore, a decrease in the pressure downstream of the valve 30 in relation to the pressure upstream of the valve 30 indicates a loss of fuel along the branch 31. The control unit ECU is configured to control the valve 30 according to the second control mode when it determines this decrease from one of the pieces of information extracted.

In other words, the control unit ECU is configured to control the valve 30 according to the second control mode when one of the pieces of information extracted, in particular that from the signal of the transducer P2 or that indicating a shift, indicates a decrease in the pressure downstream of the valve 30.

In particular, the second control mode is set when the decrease exceeds a critical decrease limit.

Alternatively, or in addition, the control unit ECU is preferably configured to control the valve 30 according to the second control mode when the engine 2 is running, i.e. it produces exhaust gases and/or is, in particular, supplied with fuel via the supply branch 38, and the burner 10 is inactive or switched off, i.e. in particular when the injector device 12 is controlled to prevent fuel entering the combustion chamber 11.

The control unit ECU is preferably configured to control the valve 30 according to the first control mode when one of the pieces of information extracted indicates an increase in pressure downstream of the valve 30 beyond a safety limit. Alternatively or in addition, the valve 30 itself is configured to be passively driven in the first control mode by the excess pressure downstream of the valve 30 or along the branch 31 beyond the safety limit. In other words, the valve 30 is configured to passively open when the pressure along the branch 31 exceeds the safety limit, i.e. to passively leak the fuel from the branch 31.

The safety limit is preferably less than 8 bar, more preferably ranging between 5 and 8 bar.

In particular, the control unit ECU controls the valve 30 in the first control mode when the shift or, more specifically, the difference between the pressures downstream and upstream of the valve 30 exceeds an additional safety limit, for example less than 8 bar or ranging between 5 and 8 bar.

In this way, the risks of excess fuel pressure along the branch 31 or downstream of the valve 30 are restricted.

In the operation of the motor vehicle 1, the burner 10 operates before the engine 2 is switched on and/or potentially after the engine 2 is switched on for a predefined time interval, preferably lasting less than 15 seconds.

The control unit ECU controls the valve 30 according to the first control mode while the burner 10 is operating, thus enabling the burner 10 to be supplied with fuel.

The control unit ECU controls the valve 30 according to the second control mode if it causes a loss along the branch 31, i.e. when one of the pieces of information extracted indicates an anomalous decrease in pressure downstream of the valve 30, in particular in relation to the pressure upstream of the valve 30.

In addition, the control unit ECU controls the valve 30 according to the second control mode when the burner 10 is off, in particular when the engine 2 is off.

In the event of excess pressure along the branch 31, i.e. downstream of the valve 30, the control unit ECU controls the valve 30 according to the first control mode, i.e. the valve 30 is passively reconfigured, i.e. without needing the control unit ECU and/or the actuator of the valve 30 itself to intervene, in the first control mode.

From the above, the advantages of the motor vehicle 1 are clear.

The valve 30 in the second control mode sharply restricts any losses of fuel isolating the branch 31 from the pump 28 and the tank 25.

The transducer P1 and especially the transducer P2 make it possible to diagnose losses along the branch 31.

In this way, the risk that fuel leaks into the combustion chamber 11, thus reaching the after-treatment device 5 in an unburnt state, is minimised.

In the event of excess pressure along the branch 31, the valve 30 enables the outlet of fuel bringing it into the first control mode, for example passively or in a controlled way via the control unit ECU.

Finally, it is clear that changes may be made to the motor vehicle 1 according to the invention, and variations produced thereto, that, in any case, do not depart from the scope of protection defined by the claims.

In particular, the number or each of the components of the motor vehicle 1, with specific reference, for example, to the branch 31, to the supply branch 38, to the injector device 12, etc., could be different to that described and illustrated.

The invention claimed is:
1. A motor vehicle, comprising:
an internal combustion engine;

an after-treatment device to treat first exhaust gases produced by the internal combustion engine;

a first exhaust line configured to feed the first exhaust gases to the after-treatment device;

combustion means distinct from the internal combustion engine and configured to produce second exhaust gases by combustion of a mixture comprising an oxidizer and a fuel, the combustion means comprising a combustion chamber and an injector device controllable to inject the fuel into the combustion chamber;

a second exhaust line configured to feed the second exhaust gases to the after-treatment device;

a tank to hold the fuel;

a supply line configured to feed a fuel stream from the tank to the injector device, wherein the supply line comprises a valve controllable according to at least a first control mode and a second control mode, and wherein the valve respectively allows and prevents a fuel flow passage to the injector device; and a transducer configured to detect a quantity indicative of a fuel pressure downstream of the valve and to generate a related signal; and a control unit configured to acquire the signal, extract from the signal a piece of information related to the fuel pressure and control the valve based on the piece of information.

2. The motor vehicle according to claim 1, wherein the second exhaust line is connected to the first exhaust line, such that the second exhaust gases can reach the after-treatment device via the first exhaust line.

3. The motor vehicle according to claim 1, wherein the supply line comprises a supply branch configured to feed at least a portion of the fuel stream from a point on the supply line upstream of the valve to the internal combustion engine.

4. The motor vehicle according to claim 1, wherein the control unit is configured to control the valve according to the second control mode when the piece of information indicates a decrease of the fuel pressure beyond a first critical limit.

5. The motor vehicle according to claim 4, wherein the control unit is configured to control the valve according to the first control mode when the piece of information indicates a growth of the fuel pressure beyond a second critical limit and/or wherein the valve is configured to be passively driven in the first control mode by the fuel pressure grown beyond the second critical limit.

6. The motor vehicle according to claim 5, wherein the second critical limit is less than 8 bar.

7. The motor vehicle according to claim 5, wherein the second critical limit is between 5 bar and 8 bar.

8. The motor vehicle according to claim 4, wherein the control unit is configured to control the valve according to the first control mode when the piece of information indicates a growth of the fuel pressure beyond a second critical limit.

9. The motor vehicle according to claim 8, wherein the valve is configured to be passively driven in the first control mode by the fuel pressure grown beyond the second critical limit.

10. The motor vehicle according to claim 4, wherein the valve is configured to be passively driven in the first control mode by the fuel pressure grown beyond a second critical limit.

11. The motor vehicle according to claim 1, wherein the control unit is configured to control the valve according to the second control mode when:

the internal combustion engine is running, and the combustion means are turned off.

12. The motor vehicle according to claim 1, wherein the valve comprises an actuator, wherein the valve is configured to operate according to the second control mode when the actuator is inactive, the actuator being operable to drive the valve according to the first control mode.

13. The motor vehicle according to claim 1, wherein the valve is a shut-off valve.

14. The motor vehicle according to claim 1, wherein the valve is a direct acting valve.

15. The motor vehicle according to claim 1, wherein the valve according to the first control mode is configured to admit a fuel flow rate between 0.0005 kg/s and 0.003 kg/s.

16. A motor vehicle, comprising:

an internal combustion engine;

an after-treatment device configured to treat first exhaust gases produced by the internal combustion engine;

a first exhaust line configured to feed the first exhaust gases to the after-treatment device;

a burner distinct from the internal combustion engine, wherein the burner is configured to produce second exhaust gases by the combustion of a mixture comprising an oxidizer and a fuel, and wherein the burner comprises a combustion chamber and an injector device controllable to inject the fuel into the combustion chamber;

a second exhaust line configured to feed the second exhaust gases to the after-treatment device;

a tank to hold the fuel;

a supply line configured to feed a fuel stream from the tank to the injector device, wherein the supply line comprises a valve controllable according to a first control mode and a second control mode, wherein the valve allows fuel to the injector device in the first control mode, and wherein the valve prevents fuel from flowing to the injector device in the second control mode;

a transducer configured to detect a quantity indicative of a fuel pressure downstream of the valve and to generate a related signal; and a control unit configured to acquire the signal, extract from the signal a piece of information related to the fuel pressure, and control the valve based on the piece of information.

* * * * *